United States Patent Office 3,255,825
Patented June 14, 1966

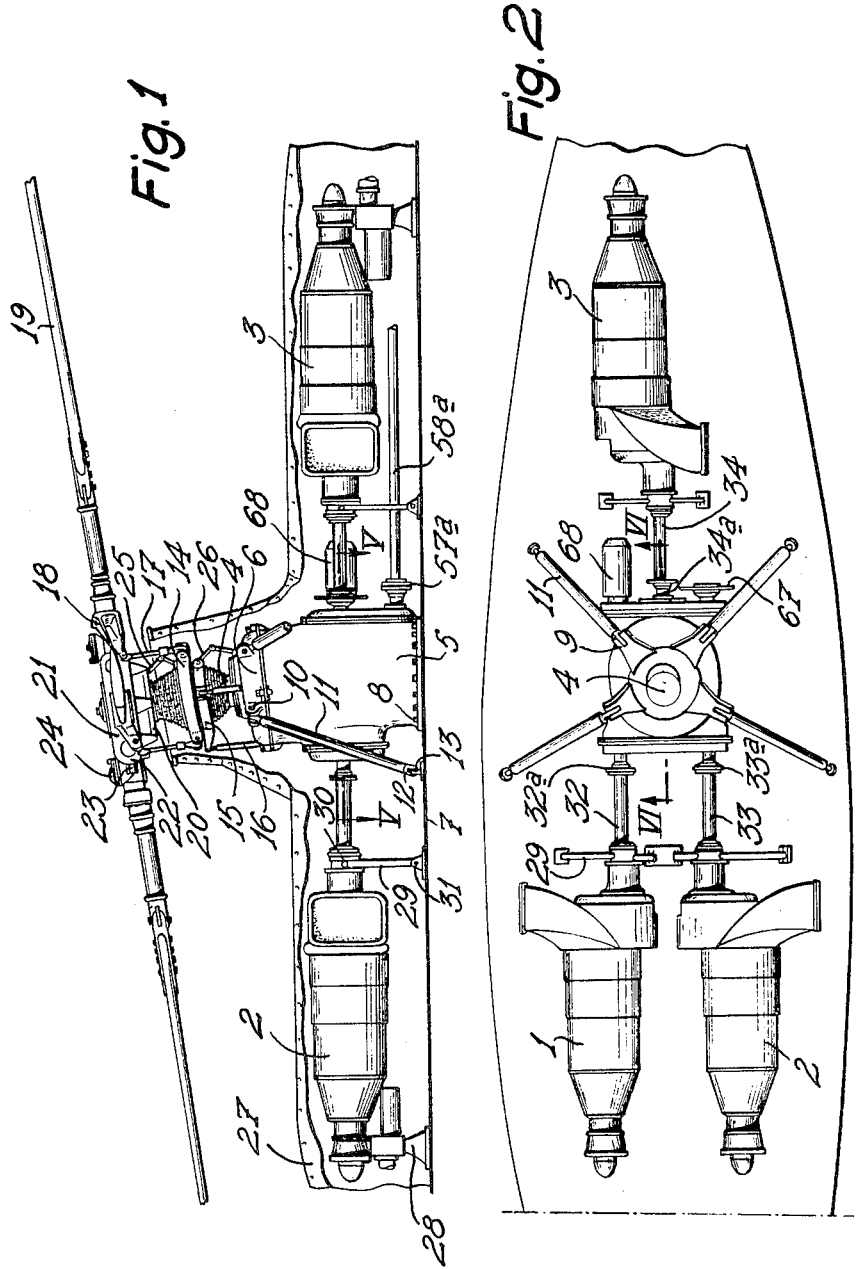

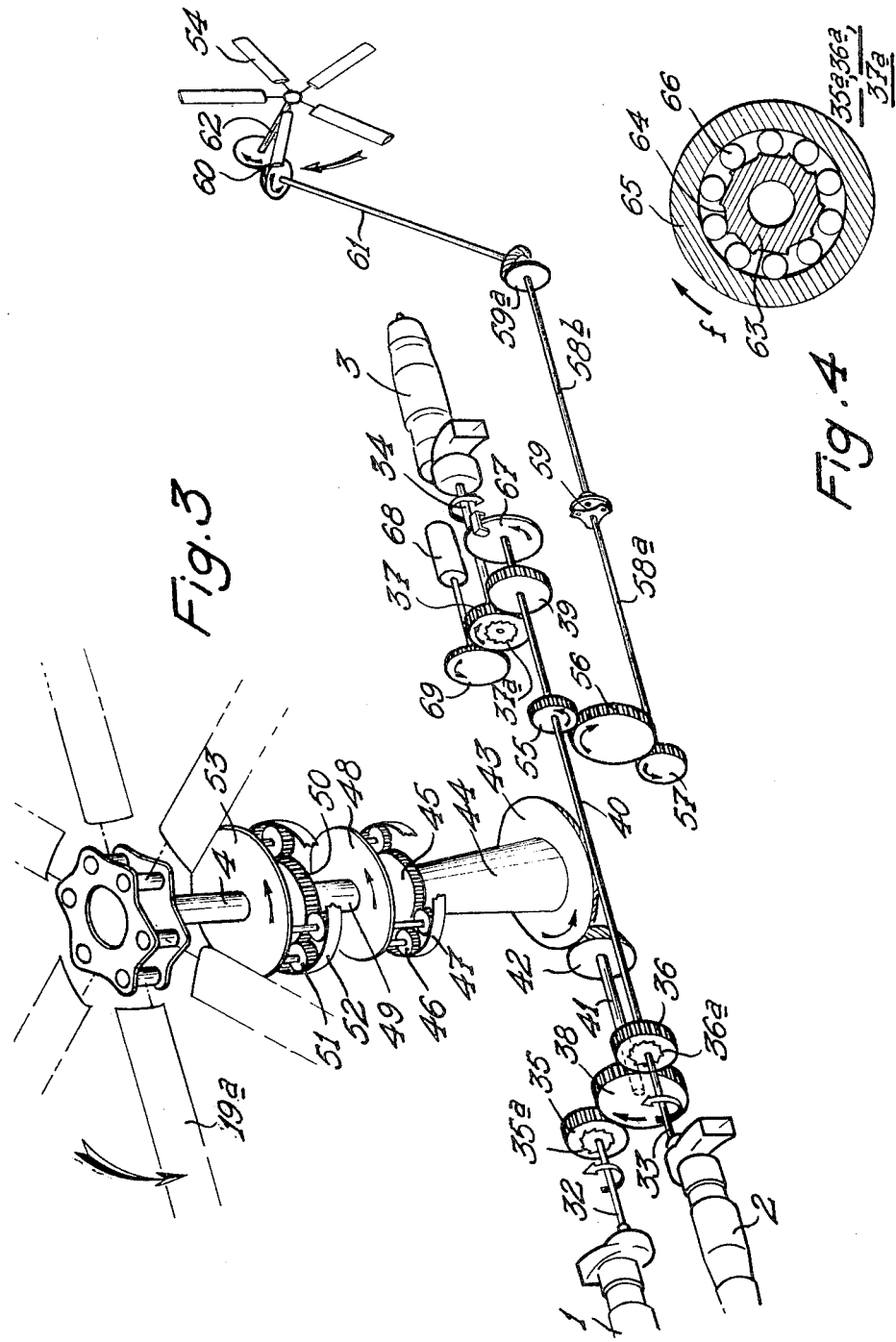

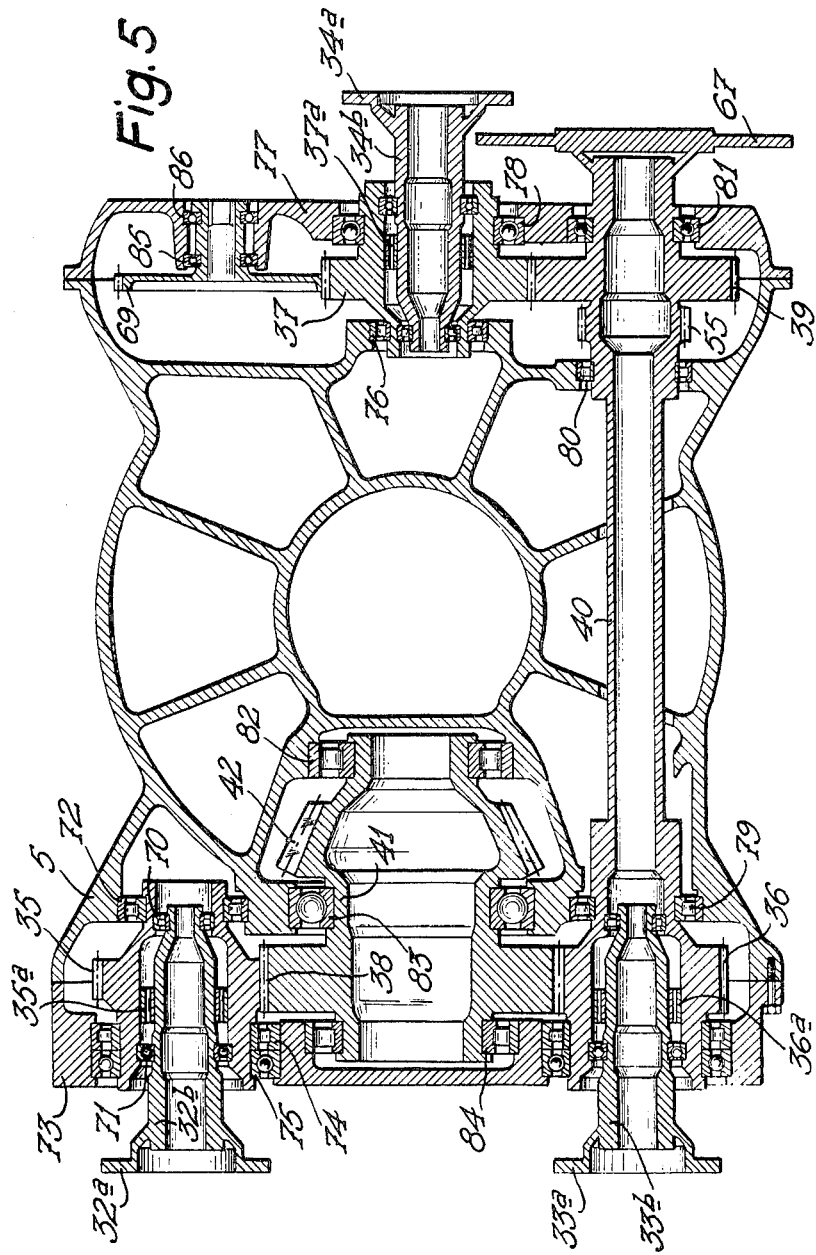

3,255,825
TRANSMISSION BOXES FOR MULTI-ENGINE, SINGLE-ROTOR HELICOPTERS
René Mouille, Enghien-les-Bains, and Charles Henry Tresch, Boulogne-sur-Seine, France, assignors to Sud-Aviation Société Nationale de Constructions Aéronautiques, Paris, France
Filed Mar. 7, 1963, Ser. No. 263,482
Claims priority, application France, Mar. 14, 1962, 890,983, Patent 1,325,704
1 Claim. (Cl. 170—135.75)

In current designs of single-rotor helicopters powered by more than one gas turbine, recourse is ordinarily had to a relatively heavy and costly transmission box which is insufficiently compact mechanically, requires the use of close assembly tolerances and is secured to the helicopter structure by complex and likewise costly means. An example of such a transmission box is described in the U.S. Patent 3,002,710 in the names of Charles Joseph Marchetti and Charles Henry Tresch and assigned to Sud-Aviation Société Nationale de Constructions Aéronautiques.

With a view to improving transmission boxes of this type, particularly with regard to their attachment method, their weight and their cost, this invention has for its object to provide a transmission box for single-rotor helicopters powered by a plurality of gas turbines respectively mounted forward and aft of said box comprising a casing which is fixed to the helicopter deck by bolts working in shear which secure its base and by four lift transmitting bars converging upon the rotor shaft and securing the top of the casing, said casing containing elastically freewheeling spur gears driven by the turbines and interconnected in respect of each pair of forward and aft turbines by a torsion shaft, such forward or aft gears meshing, whereby to constitute a first reduction stage, with a main spur gear which drives the rotor shaft through a bevel coupling and two epicyclic trains of the numerous-planet-gears type which provide three supplementary reduction stages, a power take-off on one of the torsion shafts driving the tail rotor through an elastic coupling-type transmission system, and only the gas turbine drive shafts and the tail rotor transmission system being external to said box.

The description which follows with reference to the accompanying drawings, which are filed by way of example only and not of limitation, will give a clear understanding of how the invention can be carried into practice and disclose yet further particularities thereof.

In the drawings:

FIG. 1 is a side elevational view, with the cowling cut away, of a transmission box according to this invention for equipping a helicopter powered by three gas turbines, two of which are mounted forward and one aft;

FIG. 2 is a plan view of the gas turbines transmission box system, the rotor being assumed to have been removed;

FIG. 3 is a highly diagrammatic view in perspective of the transmission system between the three gas turbines of FIG. 1 and the rotor shaft;

FIG. 4 is a cross-sectional view of one of the freewheel devices associated with one of the gas turbines;

FIG. 5 is a simplified sectional view of the transmission box, the section being taken through the line V—V of FIG. 1.

Figure 6:
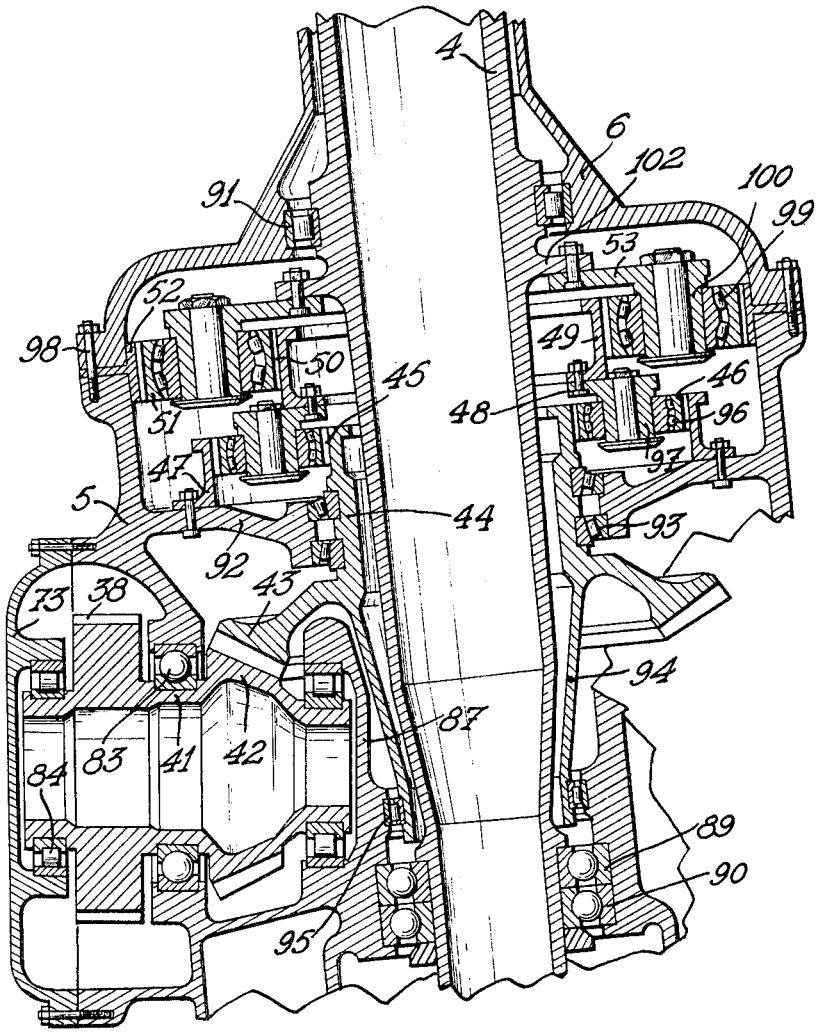
FIG. 6 is a simplified sectional view of the transmission box, the section being taken through the line VI—VI of FIG. 2.

In the embodiment illustrated in the accompanying drawings, the single-rotor helicopter, which may be of any convenient design, is powered by three gas turbine engines, preferably of the free turbine type, two forward engines 1 and 2 being disposed as symmetrically as possible relative to the helicopter centerline and one rear turbine 3 being mounted slightly to the right of said centerline. The power from these engines is transmitted to rotor shaft 4 through a transmission box comprising a casing body 5 and a cover 6. Casing 5 is secured to the supporting deck 7 by bolts 8 working in shear. Cover 6 embodies four yoke-shaped lugs 9 to which are pivotally connected through pins 10 the extremities of four tubes 11 the other extremities of which are provided with ball-and-clevis joints 12 connected to the deck 7 by ball-eye bolts 13. Said four tubes converge toward rotor shaft 4 and transmit the lifting force to the deck 7.

About rotor shaft 4 is conventionally disposed the swashplate assembly comprising the movable member 14 and the fixed member 15 with its pitch-change links 16, the pitch-control links 17 being attached to the pitch-change levers 18 carried by the blades 19, and the lower blade rest 20. The rotor hub 21 is equipped with four blades 19 (FIG. 1) or six blades 19a (FIG. 3) and comprises flapping hinges 22 which in turn incorporate drag hinges 23 associated with suitable shock-absorbers 24. The movable member 14 of the swashplate is connected to rotor shaft 4 in the conventional manner through a structure 25 having a reversed V-shaped while the fixed member 15 is held against any rotational motion by another V-shaped structure 26 attached to the transmission box cover 6.

The transmission box and the turbine engines are housed in a cabin enclosed by a cowling 27. The gas turbines are fixed to deck 7 which substantially forms the helicopter cabin roof and consists of a fireproof structural deck, which deck is generally horizontal when the helicopter is on the ground or in flight. If desired, said deck can be further shielded in the areas in register relationship with the turbine wheels.

Each gas turbine is secured at its intake end to deck 7 by a pyramid-like support 28, while its tail-pipe end is secured to said deck by two links 29 pivotally connected to transverse horizontal pins, which pins include pins 30 rigid with the engine casings and pins 31 rigid with the deck 7.

The rotor shaft is tilted slightly forward when deck 7 is horizontal.

The gas turbines have their power transmitted to the transmission box through their respective drive shafts 32, 33 and 34 which alone are external to said box, all other transmission members being housed therein.

As is schematically illustrated in FIG. 3, drive shafts 32, 33, 34 drive, inside the transmission box, spur gears 35, 36 and 37, each of which comprises a freewheeling system 35a to 37a of the teeth-and-rollers and deformable-ring type. The three gas turbines 1 to 3 are cross-connected, on the one hand through a main spur gear 38 associated with the forward engines 1 and 2 and, on the other, through a connecting spur gear 39 associated with the rear turbine and mounted on a torsion shaft 40 driven by gear 36. This coupling forms a first reduction stage.

Main spur gear 38 is coupled through a shaft 41 to a bevel pinion 42 meshing with a bevel ring-gear 43, which coupling forms a second reduction stage.

Third and fourth reduction stages are obtained by means of epicyclic gear trains comprising a large number of planet gears, as will be described hereinbelow.

Bevel ring-gear 43 is rigid with a hollow shaft 44, which shaft mounts a sun gear 45 meshing with eight planet gears 46 which in turn mesh with a stationary ring-gear 47. These planet gears are mounted on a plate 48 rigid with a hollow shaft 49 which they rotate. This assembly forms the third reduction gear train.

Hollow shaft 49 is rigid with a sun gear 50 driving nine planet gears 51 which mesh with a second stationary ring-gear 52 and are carried on a plate 53 rigidly united with rotor shaft 4. This coupling forms the fourth reduction gear train. The tail or rear anti-torque rotor 54 which normally equips the helicopter is driven from a power take-off on the torsion shaft 40. To this end, a power take-off spur gear 55 angularly rigid with shaft 40 drives, through an intermediate spur gear 56, a drive spur gear 57 which is angularly rigid with a torsion shaft divided into two sections 58a and 58b which are interconnected through an elastic coupling 59. Said torsion shaft drives tail rotor 54 through two bevel couplings 59a and 60 and torsion shafts 61 and 62. In FIGS. 5 and 6, which illustrate a specific embodiment, like reference numerals designate like parts to those in FIG. 3.

Each freewheel system 35a to 37a comprises, as shown in FIG. 4, a hub 63 connected to the corresponding shaft 32 to 34 and is provided on its periphery with ten crowding ramps 64 which, when said hub is rotated in the direction of arrow f, causes rotation of the outer freewheel race 65 formed by the inner cylindrical surface of the corresponding hollow spur gear 35 to 37 by jamming of the rollers 66 disposed between said ramps and said inner cylindrical surface.

Upon torsion shaft 40 is keyed the rotor brake 67. The system is furthermore capable of driving ancillary devices such as a generator 68 through the medium of a power take-off spur gear 69 meshing with spur gear 37.

Reference is now had to FIG. 5, in which the coupling between drive shafts 32 to 34 and spur gears 35 to 37 is effected by coupling means 32a to 34a projecting from casing 5 and rigid with a stepped hollow hub 32b to 34b which is connected to the corresponding hollow gear 35 to 37 by freewheel systems 35a to 37a and is supported within said hollow gears by roller bearings 70 and thrust bearings 71. The spur gears 35 and 36 are supported in casing 5 by roller bearings 72 and in the side cover 73 sealing off said casing 5 by roller bearings 74 and thrust bearings 75. Similarly, gear 37 is mounted in casing 5 through the medium of a roller bearing 76 and in the upper side cover 77 by means of a thrust bearing 78. A similar assembly is utilized for the part 57a coupling onto torsion shaft 58a-58b (see FIGS. 1 and 3). Shaft 40 is centrally located in casing 5 at one of its extremities by a roller bearing 79 and at its other extremity, which supports spur gears 39 and 55, by a roller bearing 80, and in the side cover 77 by a thrust bearing 81. The assembly consisting of gear 38, coupling shaft 41 and bevel gear 42 is supported in casing 5 by a roller bearing 82 and a thrust bearing 83 and in side cover 73 by a roller bearing 84. Spur gear 69 is adapted to mesh with ancillaries such as generator 68 and is supported in the side cover 77 by a roller bearing 85 and a thrust bearing 86.

As is clearly shown in FIG. 6, the transmission box casing 5 consists of an inner sleeve 87 within which rotor shaft 4 is centered by means of two thrust bearings 89 and 90. Shaft 4 is additionally centered in cover 6 by a roller bearing 91. Casing 5 furthermore comprises a web 92 into which the bevel ring-gear 43 is centered by means of two angular-contact bearings 93, said ring-gear being additionally centered, through the medium of an extension 94 and a roller bearing 95, in sleeve 87.

Fixedly attached to web 92 is the ring-gear 47 meshing with the planet gears 46 driven by sun gear 45. Through the medium of self-aligning bearings 96, said planet gears are centered upon shaft 97 carried by plate 48 fixed on hollow shaft 49, which shaft is provided over its outer surface with the teeth of sun gear 50 which meshes with the planet gears 51 which engage with the ring-gear 52 clamped between cover 6 and casing 5 by studs 98. Planet gears 51 are in turn mounted on self-aligning bearings 99 supported on shafts 100 which are mounted on the plate 53 fixed to a web 102 on the rotor shaft 4.

The transmission box hereinbefore described offers the following advantages in comparison with boxes resorted to in the aforementioned U.S. patent:

(a) Simplified attachment of the box to the structure, utilizing only four bars in conformity with the principle of separation of the forces, as opposed to the ten bars or so used hitherto. The rotor torque reaction is absorbed by the casing and transmitted to the supporting deck by the bolts working in shear. The lifting force is also transmitted to said deck, which is suitably reinforced, by the four bars which converge towards the rotor shaft and are connected to the casing cover.

(b) Improvements to the box itself;
  (1) by the reduction in weight achieved by the combined use of a high-speed, low-torque drive through the first two speed reduction stages, thereby reducing the loads imposed, and a drive taken to the tail rotor before the use of a bevel coupling, thereby permitting higher speeds, in conjunction with a reduction ratio ensuring minimum weight, and also by the use of the two epicyclic gear trains with a large number of planet gears, thus leading to reduced bulk and weight;
  (2) by the reduction in cost obtained by the simplified production operations involved and especially by the maximum use of cylindrically or helically cut gears in preference to bevel gears, and by the use of ball bearings or plain roller bearings in preference to taper roller bearings.

(c) Compactness of the mechanical section, achieved by housing the freewheel device of the first reduction stage in the transmission box casing instead of mounting it on the gas turbine output shaft, which is a novel arrangement enabling it to be lubricated by the main lubrication circuit of the box.

(d) Wider assembly tolerances, achieved by utilizing elastic couplings instead of splined sleeves for the shafts connecting the gas turbines to the transmission box, thereby making it possible to absorb both axial displacements and angular errors ascribable to faulty manufacture, or distortions due to ageing of the structure.

(e) Versatility of the three-engine layout described, since it allows for mounting a fourth engine aft by adding a second coupling shaft in place of the generator shaft, the generator being relocated elsewhere on the casing, for instance beneath said coupling shaft, an alternative possibility being to mount only two possibly more powerful turbines in a forward or rearward position, without entailing extensive modification of the reduction gearing.

What we claim is:

In a helicopter of the type having a single main rotor, a rear anti-torque rotor, a driving shaft for said main rotor, a transmission means for driving said driving shaft of the main rotor, a cabin wherein are located, on the one hand, a transmission box coaxial with the rotor driving shaft and including two superposed and interconnected epicyclic trains coaxial with the rotor shaft the upper of which is connected to said rotor shaft, and, on the other hand, a plurality of turbines disposed in two groups respectively located in front and behind said transmission box and provided with securing means for connection with the cabin deck, said turbines having power shafts directed towards said transmission box and carrying connecting means with said transmission box, said box being secured on the cabin deck by means which transmits to said deck, on the one hand, shear stresses and, on the other hand, the lifting force of the helicopter rotor: an improvement which comprises, in the transmission box, a plurality of spur gears equal in number to that of the turbines, each spur gear comprising a hollow body having an internal cylindrical surface, free wheels respectively connected to said spur gears, each free wheel connected to each corresponding spur gear comprising a hub coaxially housed in said spur gear, each free wheel being provided over its periphery with a multiplicity of crowding ramps, rollers disposed between said ramps and the inner cylindrical surface of said corresponding spur gear, transmission shafts carrying said free wheels and respectively connected to the connecting means carried by the power shafts of said turbines, a torsion shaft connected to a spur gear driven by one of the turbines pertaining to one of the turbine groups, means for mechanically interconnecting said torsion shaft and each spur gear driven by a turbine of the other group, the latter means being constituted by a connecting spur gear fitted on said torsion shaft and meshing with each spur gear driven by a turbine of the other group, one main spur gear meshing with the spur gear driven by turbines of said one turbine group, a pair of bevel gears one of which is connected to said main spur gear and the other of which is connected to the lower epicyclic train, a power take-off on said torsion shaft for driving the rear anti-torque rotor, and comprising a spur gear for power take-off connected to said torsion shaft, an intermediate spur gear meshing with said power take-off spur gear, a drive spur gear meshing with said intermediate spur gear, a second torsion shaft constituted of two sections one of which is connect to said drive spur gear, an elastic coupling interconnecting said two sections, a transmission means interposed between the other section of said second torsion shaft and the rear anti-torque rotor and comprising a bevel coupling and torsion shafts, a spur gear for power take-off for driving at least one ancillary system of said helicopter meshing with one of said spur gears connected to said turbines, and a shaft connected to said power take-off spur gear for driving said ancillary system.

References Cited by the Examiner

UNITED STATES PATENTS

| | | |
|---|---|---|
| 1,504,792 | 8/1924 | Smith. |
| 2,505,002 | 4/1950 | Orr _____ 170—135.75 X |
| 2,581,320 | 1/1952 | Burton et al. ____ 170—135.75 X |
| 2,811,324 | 10/1957 | Alex. |
| 2,979,968 | 4/1961 | Beurer. |
| 3,002,710 | 10/1961 | Marchetti et al. |
| 3,129,608 | 4/1964 | Watson _____ 170—135.75 X |

FOREIGN PATENTS

| | | |
|---|---|---|
| 753,970 | 8/1956 | Great Britain. |
| 883,869 | 12/1961 | Great Britain. |

MARK NEWMAN, *Primary Examiner.*

JULIUS E. WEST, SAMUEL LEVINE, *Examiners.*

E. A. POWELL, JR., *Assistant Examiner.*